(12) United States Patent
Sueoka et al.

(10) Patent No.: US 7,762,469 B2
(45) Date of Patent: Jul. 27, 2010

(54) SHORT-RANGE WIRELESS COMMUNICATION APPARATUS AND CELLULAR PHONE TERMINAL

(75) Inventors: Takashi Sueoka, Tokyo (JP); Takaaki Tsushima, Saitama (JP); Masayuki Chiba, Iwate (JP)

(73) Assignees: Sony Ericsson Mobile Communications Japan, Inc., Tokyo (JP); Sony Corporation, Tokyo (JP)

( * ) Notice: Subject to any disclaimer, the term of this patent is extended or adjusted under 35 U.S.C. 154(b) by 1023 days.

(21) Appl. No.: 11/319,179

(22) Filed: Dec. 28, 2005

(65) Prior Publication Data

US 2006/0160488 A1 Jul. 20, 2006

(30) Foreign Application Priority Data

Jan. 17, 2005 (JP) .............................. 2005-009462

(51) Int. Cl.
*G06K 19/06* (2006.01)
*G08B 13/14* (2006.01)
*G08B 1/08* (2006.01)
*H04M 1/00* (2006.01)
*H04B 1/38* (2006.01)

(52) U.S. Cl. .................... 235/492; 235/493; 455/575.1; 455/90.1; 455/574; 340/572.1; 340/572.8; 340/539.1; 340/539.21

(58) Field of Classification Search ................. 235/493, 235/492; 455/566, 127.1, 324, 425, 227, 455/90.1, 7, 67.7, 67.13, 455, 76, 436, 552.1, 455/41.2; 340/568.1, 573.1, 539.13, 539.23, 340/458, 468, 572.8, 531

See application file for complete search history.

(56) References Cited

U.S. PATENT DOCUMENTS

| | | | | |
|---|---|---|---|---|
| 3,613,101 A | * | 10/1971 | Leonard et al. | 235/493 |
| 4,087,660 A | * | 5/1978 | Sedley | 235/493 |
| 4,218,612 A | * | 8/1980 | Krehl et al. | 235/493 |
| 5,001,777 A | * | 3/1991 | Liautaud | 455/227 |
| 5,115,223 A | * | 5/1992 | Moody | 340/573.1 |
| 5,297,190 A | * | 3/1994 | Ito | 455/455 |
| 5,335,364 A | * | 8/1994 | Heinonen | 455/76 |
| 5,361,395 A | * | 11/1994 | Yamamoto | 455/436 |
| 5,375,140 A | * | 12/1994 | Bustamante et al. | 375/142 |

(Continued)

FOREIGN PATENT DOCUMENTS

JP 2004-266729 9/2004

*Primary Examiner*—Thien M. Le
*Assistant Examiner*—Thien T Mai
(74) *Attorney, Agent, or Firm*—Oblon, Spivak, McClelland, Maier & Neustadt, L.L.P.

(57) ABSTRACT

There is provided a short-range wireless communication apparatus and a cellular phone terminal that can surely and immediately notify a user of the optimum distance between a contactless IC card reader/writer and a contactless IC card not through an MPU or a CPU and if the contactless IC card function is locked, surely notify the user as such. In an RFID card, a magnetic field strength/brightness conversion section adjusts the brightness of two LEDs in accordance with the detected magnetic field strength of a carrier wave. A blink generation circuit detects whether the RFID card is in a communication state and blinks the LEDs if so. A function combining section combines the functions to indicate the magnetic field strength and the communication state with the brightness and blinking of the LEDs. An LED with another color illuminates only when an RFID function LSI is in a lock state.

9 Claims, 4 Drawing Sheets

U.S. PATENT DOCUMENTS

| | | | | |
|---|---|---|---|---|
| 5,768,696 | A * | 6/1998 | Law | 455/127.1 |
| 6,236,674 | B1 * | 5/2001 | Morelli et al. | 375/219 |
| 6,356,746 | B1 * | 3/2002 | Katayama | 455/324 |
| 6,490,439 | B1 * | 12/2002 | Croft et al. | 455/90.1 |
| 6,577,239 | B2 * | 6/2003 | Jespersen | 340/572.8 |
| 6,956,480 | B2 * | 10/2005 | Jespersen | 340/568.1 |
| 7,333,776 | B1 * | 2/2008 | York | 455/90.1 |
| 2001/0052846 | A1 * | 12/2001 | Jespersen | 340/539 |
| 2003/0160695 | A1 * | 8/2003 | Hisano | 340/539.13 |
| 2003/0214399 | A1 * | 11/2003 | Naruse et al. | 340/531 |
| 2004/0203352 | A1 | 10/2004 | Hall et al. | |
| 2004/0227646 | A1 * | 11/2004 | Henry | 340/902 |
| 2004/0242283 | A1 * | 12/2004 | Flores | 455/566 |
| 2004/0263330 | A1 * | 12/2004 | Alarcon | 340/539.23 |
| 2005/0001720 | A1 * | 1/2005 | Mason et al. | 340/539.13 |
| 2005/0278078 | A1 * | 12/2005 | Sterling | 340/468 |
| 2006/0066447 | A1 * | 3/2006 | Davenport et al. | 340/458 |
| 2007/0197208 | A1 * | 8/2007 | Kanada et al. | 455/425 |

* cited by examiner

SHORT-RANGE WIRELESS COMMUNICATION APPARATUS AND CELLULAR PHONE TERMINAL

CROSS REFERENCES TO RELATED APPLICATIONS

The present invention contains subject matter related to Japanese Patent Application No. 2005-009462 filed in the Japanese Patent Office on Jan. 17, 2005, the entire contents of which being incorporated herein by reference.

BACKGROUND OF THE INVENTION

1. Field of the Invention

The present invention relates to a short-range wireless communication apparatus which performs information communication with, e.g., a so-called contactless IC card reader/writer and to a cellular phone terminal having the short-range wireless communication apparatus.

2. Description of the Related Art

In recent years, a contactless IC card (hereinafter referred to as an RFID card) having a built-in RFID (Radio Frequency-Identification) circuit has been coming into wide use as, e.g. a train ticket and a prepaid card because the RFID card has the advantages of good usability, excellent durability, simultaneous accessibility to multiple cards, easy maintenance, etc.

Further, since a cellular phone terminal having the RFID card built-in has been commercialized recently, by electronically transferring monetary information between the RFID card incorporated into the cellular phone terminal and a contactless IC card reader/writer (hereinafter referred to as an RFID card reader/writer) provided at e.g. a store, it is possible to pay for a purchase at the store etc.

Hereinafter, a description will be made on the flow of communication operation in an RFID system composed of an RFID card incorporated into a mobile terminal such as a cellular phone terminal and an RFID card reader/writer provided at a store etc. As a specific example of the RFID system, the flow of communication operation in the so-called felica (trademark) system is described below.

First, in the RFID system, the RFID card reader/writer (not shown) always transmits carrier waves and polling commands.

In the case where the cellular phone terminal having the built-in RFID card is close to the RFID card reader/writer, the RFID card incorporated into the cellular phone terminal activates by receiving a carrier wave transmitted from the RFID card reader/writer. Upon receiving a polling command transmitted from the RFID card reader/writer, the RFID card determines whether the received polling command conforms to a service installed in the RFID card. Only if the received polling command conforms to the service, the RFID card sends a response to the RFID card reader/writer.

Next, when the RFID card sends a response to the RFID card reader/writer as described above, mutual authentication is performed between the RFID card reader/writer and the RFID card. Afterward, the RFID card reader/writer reads and writes data in the RFID card as necessary.

When the series of processes is completed correctly, the RFID card reader/writer notifies a user that the series of processes has been completed correctly in a specified manner of the RFID system. Specified manners in which the RFID card reader/writer notifies a user that the series of processes has been correctly completed include manners such as sounding a specified alarm from a speaker connected to the RFID card reader/writer and displaying a specified indication on the screen of the display connected to the RFID card reader/writer.

FIG. 4 is a schematic circuit diagram of a transponder section of the RFID card.

In FIG. 4, a loop antenna 101 receives a carrier wave having a frequency of 13.56 MHz transmitted from the RFID card reader/writer (not shown) and generates the potential difference of a waveform corresponding to the magnetic field change of the carrier wave between antenna terminals 101a and 101b. The antenna terminals 101a and 101b is connected to the RFID function LSI (Large Scale Integration) 110.

Further, a tuning capacitor 102 exists between the antenna terminals 101a and 101b and the RFID function LSI 110. The tuning capacitor 102 is a capacitor for producing a resonance frequency of 13.56 MHz, combined with an inductance component of the loop antenna 101.

Furthermore, a rectifier diode 103 exists between the antenna terminal 101b and the RFID function LSI 110. The rectifier diode 103 shifts a voltage waveform on the loop antenna 101 to a plus side relative to the ground (GND), thereby allowing the RFID function LSI 110 operated by a single power source to easily process the voltage waveform. The rectifier diode 103 is also used for extracting a direct-current (DC) power source from the carrier wave received by the loop antenna 101.

The RFID function LSI 110 includes a receiving circuit 112 for performing demodulation to extract a 212-kHz signal component out of the so-called ASK (Amplitude Shift Keying) modulated carrier wave from the RFID card reader/writer, a transmitting circuit 113 for modulating a transmission signal, an FET (Field Effect Transistor) circuit 114 for switching a load, an MPU (Micro Processing Unit) 115 for implementing a clock extraction circuit and a higher layer of a wireless communication protocol, and a non-volatile memory (not shown). Further, the resistor 104 for adjusting a load modulation rate is connected to the RFID function LSI 110.

Further, a lock signal for disabling or enabling the RFID card function is provided to an enable input terminal of the RFID function LSI 110 via a lock signal input terminal 105. The lock signal is low at the time of disabling the RFID card function.

Further, Japanese Patent Application Laid-Open No. 2004-266729 (patent document 1) discloses the following technique. In a cellular phone terminal having a contactless IC card built-in, when the contactless IC card is close to a reader/writer so that an induced voltage in the contactless IC card caused by a carrier wave from the reader/writer exceeds a predetermined voltage, a CPU (Central Processing Unit) in the cellular phone terminal lights an LED (Light Emitting Diode) in yellow for example, thereby notifying a user that the contactless IC card has come so close to the reader/writer that they can communicate with each other. Next, when the contactless IC card receives a start command from the reader/writer, the CPU in the cellular phone terminal lights the LED in blue for example, thereby notifying the user that communication processing between the contactless IC card and the reader/writer has started. Moreover, when data communication is being performed between the contactless IC card and the reader/writer, the CPU in the cellular phone terminal blinks the LED in blue for example, thereby notifying the user that data communication is being performed between the contactless IC card and the reader/writer.

[Patent document 1] Japanese Patent Application Laid-Open No. 2004-266729 (FIG. 1)

SUMMARY OF THE INVENTION

In a past RFID system, as described above, when the series of processes is completed correctly, the system notifies the user as such. As a result, the following problems arise.

In the case where communication is not established due to something unusual such as a bad positional relationship between the RFID card reader/writer and the RFID card or locking the RFID function into a disabled state, both the RFID card reader/writer and the RFID card remain in the no response state in the past RFID system. In the case where the RFID system is in the no response state, at first the user cannot grasp what has happened, and it takes time to recognize that a communication error has occurred between the RFID card reader/writer and the RFID card. Therefore, in a case where the RFID system is used for an automatic gate in a station, a communication error takes the user some time to pass through the automatic gate, thereby causing congestion in the flow of users around the automatic gate. Further, in a case where the RFID system is used for a checkout counter in a store, a communication error prevents the user from smoothly paying for a purchase at the checkout counter in the store, thereby causing crowdedness around the checkout counter.

On the other hand, as described above, when the series of processes is completed correctly between the RFID card reader/writer and the RFID card, the system provides a specified notification to the user. However, in the past RFID system, it takes approximately 1 second to provide the specified notification after the RFID card is held over the RFID card reader/writer. For this reason, the user cannot know whether the series of processes is being performed correctly during the interval from when the RFID card is held over the RFID card reader/writer and the specified notification is provided. In other words, the past RFID system gives the user a feeling of uneasiness during the interval from when the RFID card is held over the RFID card reader/writer and the specified notification is provided.

Further, in the past RFID system, a specified mark indicating an optimum positional relationship at the time of holding the cellular phone terminal over the RFID card reader/writer is generally put on the enclosure of the cellular phone terminal having the built-in RFID card. However, at the time of actually holding the cellular phone terminal over the RFID card reader/writer, it is necessary to place the specified mark face to the RFID card reader/writer; therefore, the user cannot see the mark. Thus, in the past RFID system, a problem such as a communication error caused by positional deviation between the RFID card reader/writer and the RFID card is more likely to occur. Furthermore, in the past RFID system, the user cannot know the distance between the RFID card reader/writer and the cellular phone terminal (RFID card) within which the RFID card reader/writer and the cellular phone terminal can communicate well with each other. In other words, the user cannot know the distance between the RFID card reader/writer and the cellular phone terminal beyond which the RFID card reader/writer and the cellular phone terminal cannot communicate with each other. Accordingly, the user feels inconvenient and uneasy about using the RFID card.

Further, with the technique described in the patent document 1, it is possible to notify the user of the distance between the reader/writer and the contactless IC card within which the reader/writer and the contactless IC card can communicate with each other. However, for example, in the case where the function of the contactless IC card incorporated into the cellular phone terminal is locked into a disabled state, that is, the MPU in the contactless IC card is disabled, or the CPU of the cellular phone terminal is brought to a state in which the CPU cannot perform processing on the contactless IC card function, it is impossible to notify the user of the distance.

The present invention has been made in view of the above circumstances, and it is desirable to provide a short-range wireless communication apparatus and a cellular phone terminal that can surely and immediately notify the user of the distance between the contactless IC card reader/writer and the contactless IC card within which the contactless IC card reader/writer and the contactless IC card can communicate well with each other, that is, the distance between the contactless IC card reader/writer and the contactless IC card beyond which the contactless IC card reader/writer and the contactless IC card cannot communicate with each other, not through the MPU of the contactless IC card or the CPU of the cellular phone terminal, and if the contactless IC card function is locked into the disabled state, surely notify the user as such.

According to an embodiment of the invention, there is provided a short-range wireless communication apparatus which includes a magnetic field strength detector detecting magnetic field strength from a carrier wave by extracting direct-current potential from the carrier wave used for short-range wireless communication, a magnetic field strength notification device notifying a user of the magnetic field strength detected by the magnetic field strength detector, and a magnetic field strength notification signal generator generating a magnetic field strength notification signal for operating the magnetic field strength notification device in accordance with the magnetic field strength detected by the magnetic field strength detector.

Further, according to an embodiment of the invention, there is provided a short-range wireless communication apparatus which includes a communication detector detecting signal communication from a carrier wave used for short-range wireless communication, a communication notification device notifying a user that the communication detector is detecting the signal communication, and a communication notification signal generator generating a communication notification signal for operating the communication notification device in accordance with the signal communication detected by the communication detector.

Furthermore, according to an embodiment of the invention, there is provided a short-range wireless communication apparatus which includes a magnetic field strength detector detecting magnetic field strength from a carrier wave by extracting direct-current potential from the carrier wave used for short-range wireless communication, a lock detector detecting that a short-range wireless communication function is locked into at least a disabled state when the magnetic field strength detector detects the magnetic field strength from the carrier wave, a lock notification device notifying a user that the lock detector has detected the disabled state, and a lock notification signal generator generating a lock notification signal for operating the lock notification device in accordance with the disabled state detected by the lock detector.

Moreover, according to an embodiment of the invention, there is provided a short-range wireless communication apparatus which includes a magnetic field strength detector detecting magnetic field strength from a carrier wave by extracting direct-current potential from the carrier wave used for short-range wireless communication, a communication detector detecting signal communication from a carrier wave used for short-range wireless communication, a lock detector detecting that a short-range wireless communication function is locked into at least a disabled state when the magnetic field strength detector detects the magnetic field strength from the carrier wave, a notification device notifying a user of the magnetic field strength detected by the magnetic field strength detector, the signal communication detected by the communication detector, and the disabled state detected by the lock detector, a first notification signal generator generating a first notification signal for operating the notification device in accordance with the magnetic field strength detected by the magnetic field strength detector, a second notification signal generator generating a second notification signal for operating the notification device in accordance with the signal communication detected by the communication detector, and a third notification signal generator generating a third notification signal for operating the notification device in accordance with the disabled state detected by the lock detector.

Further, according to an embodiment of the invention, there is provided a cellular phone terminal having a short-range wireless communication apparatus according to embodiments of the invention.

That is, according to embodiments of the invention, it is possible to detect the magnetic field strength of a carrier wave used for short-range wireless communication, the signal communication by short-range wireless communication, and whether or not the function of short-range wireless communication is locked into the disabled state and then notify the user of them.

According to embodiments of the invention, since it is possible to detect the magnetic field strength of a carrier wave and notify the user of it while notifying the user of the communication state of short-range wireless communication, for example it is possible to surely and immediately notify the user of the distance between the contactless IC card reader/writer and the contactless IC card within which the contactless IC card reader/writer and the contactless IC card can communicate well with each other, not through the MPU of the contactless IC card or the CPU of the cellular phone terminal. Further, since it is also possible to detect whether or not the function of short-range wireless communication is locked into the disabled state, for example if the contactless IC card function is locked into the disabled state, it is possible to surely notify the user as such.

BRIEF DESCRIPTION OF THE DRAWINGS

Embodiments of the present invention will be described in detail based on the following figures, wherein.

DESCRIPTION OF THE PREFERRED EMBODIMENTS

Hereinafter, an embodiment of the present invention will be described with reference to the accompanying drawings.

In the following description, a cellular phone terminal having a built-in RFID card is exemplified as an embodiment of a short-range wireless communication apparatus and a cellular phone terminal according to an embodiment of the invention. However, the description in this specification is just an example, and it is needless to say that the invention is not limited to this example.

Figure 1:
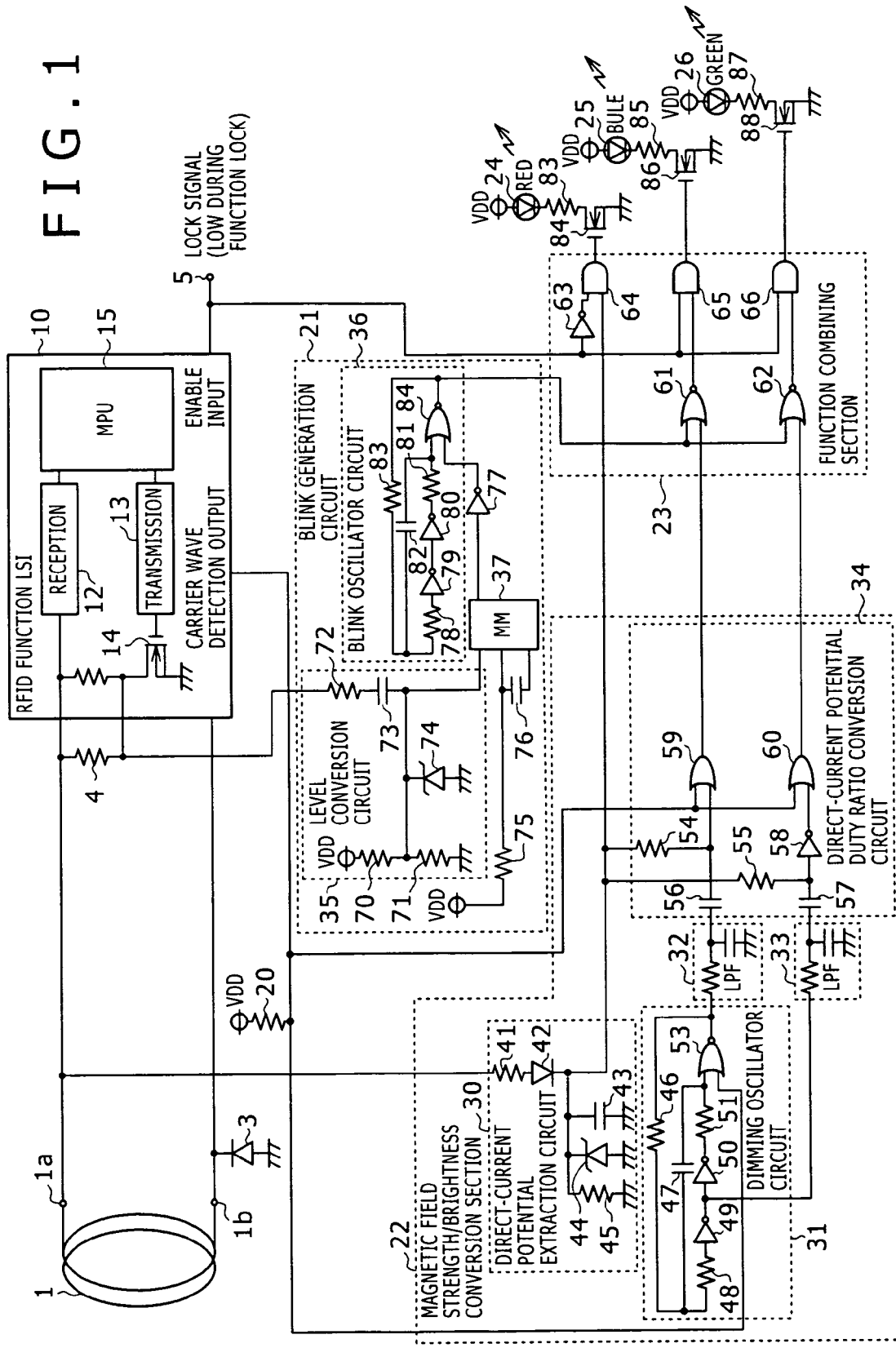
FIG. 1 is a circuit diagram of a short-range wireless communication apparatus according to an embodiment of the present invention.

[Outline of internal circuit configuration] FIG. 1 is a schematic circuit diagram of a short-range wireless communication apparatus according to this embodiment of the invention in which a circuit configuration according to this embodiment is provided at a transponder section of a general RFID card.

The short-range wireless communication apparatus according to this embodiment has a first lighting control function for lighting e.g. a blue light upon detection of a carrier wave from an RFID card reader/writer (not shown), a second lighting control function for increasing the brightness of e.g. a green light while decreasing the brightness of e.g. a blue light as magnetic field strength by the carrier wave increases and decreasing the brightness of the green light while increasing the brightness of the blue light as magnetic field strength by the carrier wave decreases, a third lighting control function for blinking the blue light and the green light lit by the second lighting control function during communication with the RFID card reader/writer, and a fourth lighting control function for lighting a red light while extinguishing both the blue light and the green light irrespective of the strength of the carrier wave in the case where an RFID card function is locked into a disabled state. Further, the short-range wireless communication apparatus according to this embodiment is provided with a display section composed of three color LEDs that are a red LED 24, a blue LED 25, and a green LED 26, a magnetic field strength/brightness conversion section 22 for converting the magnetic field strength of a carrier wave into the brightness of the blue LED 25 and the green LED 26, a blink generation circuit 21 for blinking the blue LED 25 and the green LED 26, and a function combining section 23 for combining the functions of the magnetic field strength/brightness conversion section 22 and the blink generation circuit 21, as a configuration for implementing the first to fourth lighting control functions.

The display section composed of the three color LEDs is a display device for notifying a user of communication states of whether the RFID card is ready for communication, whether the distance between the RFID card and the RFID card reader/writer is appropriate, and whether communication is carried out between the RFID card and the RFID card reader/writer.

The magnetic field strength/brightness conversion section 22 is a circuit for determining how to light the three color LEDs of the display section and has the function of changing the brightness of the LEDs in accordance with the magnetic field strength of the carrier wave received by a loop antenna 1. That is, in this embodiment, the magnetic field strength/brightness conversion section 22 decreases the brightness of the green LED 26 while increasing the brightness of the blue LED 25 in the case of a weak carrier wave, and gradually decreases the brightness of the blue LED 25 while increasing the brightness of the green LED 26 as the strength of the carrier wave increases. Thereby, for example, in the case where the strength of the carrier wave gradually increases by bringing the RFID card gradually closer to the RFID card reader/writer, it appears to a user that the LED color of the display section gradually changes from blue, through blue-green to green. Further, in this embodiment, the relationship between the strength of the carrier wave and the color is an example. By changing LED colors to be used, it is possible to freely change the relationship between the strength of the carrier wave and the color.

The blink generation circuit 21 is a circuit for determining how to light the three color LEDs of the display section as in the case of the magnetic field strength/brightness conversion section 22 and has the function of blinking LEDs illuminating in colors determined by the magnetic field strength/brightness conversion section 22 during communication between the RFID card reader/writer and the RFID card. In this specification, the blink generation circuit 21 determines whether or not communication is carried out between the RFID card and the RFID card reader/writer by watching the operation of an FET 14 for load switching embedded in an RFID function LSI 10, or more specifically, detecting a wave level of a resistor 4 for adjusting a load modulation rate.

The function combining section 23 is a logical circuit for performing LED lighting control by the magnetic field strength/brightness conversion section 22 and the blink generation circuit 21 on the same LEDs (the blue LED 25 and the green LED 26). The function combining section 23 combines LED lighting controls by the magnetic field strength/brightness conversion section 22 and the blink generation circuit 21. Thereby, for example, in the case where the user gradually moves the RFID card toward or away from the RFID card reader/writer during communication between the RFID card reader/writer and the RFID card, it appears to the user that the display section changes its LED color while blinking.

[Details of internal circuit configuration] Hereinafter, a more detailed description will be made of each component in FIG. 1.

First, a description will be given of the transponder section of the RFID card.

The loop antenna 1 receives a carrier wave having a frequency of 13.56 MHz transmitted from the RFID card reader/writer (not shown) and generates the potential difference of a waveform corresponding to the magnetic field change of the carrier wave between antenna terminals 1*a* and 1*b*. The antenna terminals 1*a* and 1*b* is connected to the RFID function LSI 10.

A rectifier diode 3 exists between the antenna terminal 1*b* and the RFID function LSI 10. The rectifier diode 3 shifts a voltage waveform on the loop antenna 1 to a plus side relative to the ground (GND), thereby allowing the RFID function LSI 10 operated by a single power source to easily process the voltage waveform. The rectifier diode 3 is also used for extracting a direct-current (DC) power source from the carrier wave received by the loop antenna 1.

The RFID function LSI 10 includes a receiving circuit 12 for performing demodulation to extract a 212-kHz signal component out of the so-called ASK modulated carrier wave from the RFID card reader/writer, a transmitting circuit 13 for modulating a transmission signal, an FET circuit 14 for switching a load, an MPU 15 for implementing a clock extraction circuit and a higher layer of a wireless communication protocol, and a non-volatile memory (not shown). Further, the resistor 4 for adjusting a load modulation rate is connected to the RFID function LSI 10.

Further, a lock signal for disabling or enabling the RFID card function, i.e., the RFID function LSI 10 is provided to an enable input terminal of the RFID function LSI 10 via a lock signal input terminal 5 from a controller (not shown). Further, in the case where the short-range wireless communication apparatus according to this embodiment is incorporated in a cellular phone terminal, the controller for providing the lock signal is a CPU or the like of the cellular phone terminal.

Furthermore, in this embodiment, if the lock signal is a low level, the RFID function LSI 10 is disabled, and if the lock signal is a high level, the RFID function LSI 10 is enabled.

Next, a description will be made of each configuration for implementing the first to forth lighting control functions added to the transponder section of the RFID card.

In the display section composed of three color LEDs, the anode of the red LED 24 is connected to a power source VDD, and the cathode is connected through a current limiting resistor 83 to an FET 84. When the FET 84 is activated, the red LED 24 lights up. Further, the anode of the blue LED 25 is connected to the power source VDD, and the cathode is connected through a current limiting resistor 85 to an FET 86. When the FET 86 is activated, the blue LED 25 lights up. In the same way, the anode of the green LED 26 is connected to the power source VDD, and the cathode is connected through a current limiting resistor 87 to an FET 88. When the FET 88 is activated, the green LED 26 lights up. This embodiment uses a three-color LED in which three LEDs of red, blue and green are embedded in one device.

The magnetic field strength/brightness conversion section 22 is composed of a direct-current potential extraction circuit 30, a dimming oscillator circuit 31, two low-pass filters (LPF) 32 and 33, and a direct-current potential/duty ratio conversion circuit 34.

The direct-current potential extraction circuit 30 is a circuit for extracting a plus peak value of a loop antenna output waveform excited by an external magnetic field (i.e., the carrier wave from the RFID card reader/writer) and obtaining the direct-current potential corresponding to the strength of the carrier wave by smoothing the waveform with a capacitor 43, and sends the direct-current potential corresponding to the strength of the carrier wave to the direct-current potential/duty ratio conversion circuit 34 of the subsequent stage. Further, the direct-current potential extraction circuit 30 is provided with a zener diode 44 for overvoltage protection for input to an IC of the subsequent stage, a pull-down resistor 45 for potential adjustment, and a resistor 41 and a diode 42 for reducing the effect on the antenna.

The dimming oscillator circuit 31 is an oscillator circuit for generating a rectangular wave signal having a predetermined frequency which is used at the time of changing the brightness of the LEDs (the blue LED 25 and the green LED 26 in the case of this embodiment) in accordance with the direct-current potential extracted from the carrier wave by the direct-current potential extraction circuit 30.

A carrier wave detection output terminal of the RFID function LSI 10 is connected to one of the input terminals of a NOR circuit 53 in the dimming oscillator circuit 31. Further, a pull-up resistor 20 exists between the carrier wave detection output terminal of the RFID function LSI 10 and the NOR circuit 53. The output terminal of the NOR circuit 53 is connected to the input terminal of the low-pass filter 32. Further, the output terminal of the NOR circuit 53 is connected through a resistor 46 for setting an oscillation frequency and a capacitor 47 to the other input terminal of the NOR circuit 53 and also connected through a resistor 48 for input protection to the input terminal of a NOT circuit 49. Further, the output terminal of the NOT circuit 49 is connected to the input terminal of a NOT circuit 50 of the next stage and also connected to the input terminal of the other low-pass filter 32. The output terminal of the NOT circuit 50 is connected through a damping resistor 51 to the other input terminal of the NOR circuit 53.

With this configuration, the dimming oscillator circuit 31 oscillates at a frequency determined by the resistor 46 and the capacitor 47 and outputs a rectangular wave signal having the oscillation frequency to the low-pass filters 32 and 33. Further, in this embodiment, the dimming oscillator circuit 31 is configured such that a carrier wave detection output of the RFID function LSI 10 is inputted to the NOR circuit 53 and the dimming oscillator circuit 31 oscillates only when the RFID function LSI 10 detects a carrier wave and does not oscillate when the RFID card is not close to the RFID card reader/writer, thus making it possible to avoid unnecessary current drain and noise radiation.

Further, if the oscillation frequency of the dimming oscillator circuit 31 is too low, the cycle period of lighting and extinguishing of the LEDs of the next stage is long so that the LEDs flicker. If the oscillation frequency of the dimming oscillator circuit 31 is too high, it causes noise which affects other circuits and signals. Therefore, it is desirable to have oscillation frequencies of about 100 Hz to 200 Hz. Further, the dimming oscillator circuit 31 may be realized in another configuration besides that of FIG. 1 as long as the dimming oscillator circuit 31 can oscillate at frequencies of about 100 Hz to 200 Hz with stability.

The low-pass filters 32 and 33 are filters for integrating rectangular wave signals provided from the dimming oscillator circuit 31 into triangular wave signals and output the triangular wave signals to the direct-current potential/duty ratio conversion circuit 34. This embodiment exemplifies CR filters composed of resistors and capacitors; however, the low-pass filters 32 and 33 may be realized in any other configurations.

The direct-current potential/duty ratio conversion circuit 34 cuts respective direct-current (DC) components from the triangular wave signals of the low-pass filters 32 and 33 by DC cutting capacitors 56 and 57 and adds direct-current potential from the direct-current potential extraction circuit 30 to the DC-cut signals through decoupling resistors 54 and 55 provided at the outputs of the low-pass filters 32 and 33.

Further, the wave signal to which the direct-current potential corresponding to the strength of the carrier wave is added after the DC component is cut by the DC cutting capacitor 56 is sent to one of the input terminals of an OR circuit 59. The wave signal to which the direct-current potential corresponding to the strength of the carrier wave is added after the DC component is cut by the DC cutting capacitor 57 is sent through a NOT circuit 58 to one of the input terminals of an OR circuit 60. Furthermore, the carrier wave detection output terminal of the RFID function LSI 10 is connected to the other input terminals of the OR circuits 59 and 60.

Thus, the direct-current potential/duty ratio conversion circuit 34 outputs two rectangular wave signals having the duty ratios corresponding to the direct-current potential from the direct-current potential extraction circuit 30 when the RFID function LSI 10 detects a carrier wave.

The two rectangular wave signals outputted from the direct-current potential/duty ratio conversion circuit 34 are sent to the function combining section 23 of the next stage and become signals for turning on or off the FET 86 for the blue LED 25 and for turning on or off the FET 88 for the green LED 26, respectively. Therefore, the longer the FET (86 or 88) on time, the brighter the corresponding LED (the blue LED 25 or the green LED 26). On the contrary, the longer the FET off time is, the darker the corresponding LED is.

Figure 2:
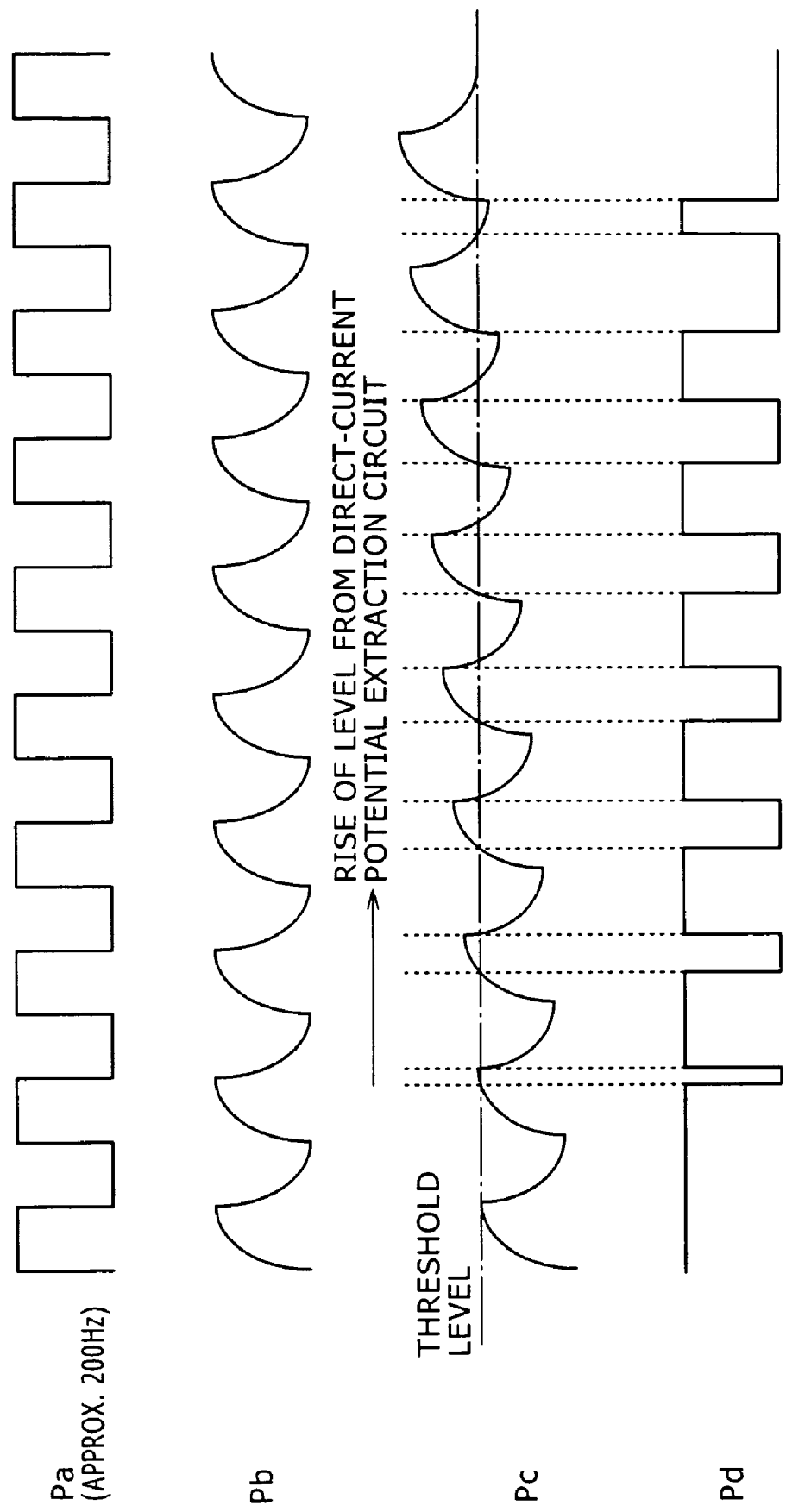
FIG. 2 shows timing charts for explaining the operation of the sections between a dimming oscillator circuit and a direct-current potential/duty ratio conversion circuit.

FIG. 2 shows timing charts of the wave signals between the output of the dimming oscillator circuit 31 and the output of the direct-current potential/duty ratio conversion circuit 34. Further, FIG. 2 shows only the timing charts of the waveforms corresponding to the green LED 26.

In FIG. 2, Pa denotes a rectangular wave signal that is outputted from the NOT circuit 49 of the dimming oscillator circuit 31 and is inputted to the low-pass filter 33. The rectangular wave signal outputted from the NOT circuit 49 of the dimming oscillator circuit 31 becomes a triangular wave signal through the low-pass filter 33, as shown by Pb in FIG. 2.

Next, in the output wave signal of the low-pass filter 33, the DC component thereof is cut by the DC cutting capacitor 57 and the direct-current potential is added from the direct-current potential extraction circuit 30. If the direct-current potential provided from the direct-current potential extraction circuit 30 is low so that the triangular wave signal of the low-pass filter 33 in which the DC component is cut by the DC cutting capacitor 57 is lower than the threshold level of the NOT circuit 58 of the next stage as shown by Pc in FIG. 2, the NOT circuit 58 outputs a high level as shown by Pd in FIG. 2.

On the other hand, if the direct-current potential provided from the direct-current potential extraction circuit 30 becomes high and the triangular wave signal of the low-pass filter 33 in which the DC component is cut by the DC cutting capacitor 57 exceeds the threshold level of the NOT circuit 58 of the next stage as shown by Pc in FIG. 2, the NOT circuit 58 outputs a low level as shown by Pd in FIG. 2.

Consequently, when the direct-current potential from the direct-current potential extraction circuit 30 gradually increases, the NOT circuit 58 outputs a wave signal that produces longer low-level periods and shorter high-level periods as shown by Pd in FIG. 2. In this case, the brightness of the green LED 26 of the subsequent stage gradually increases.

Although FIG. 2 exemplifies only the timing charts of the waveforms corresponding to the green LED 26, the blue LED 25 operates with the logic inverted from the example of FIG. 2. Therefore, the brightness of the blue LED 25 gradually decreases as the direct-current potential from the direct-current potential extraction circuit 30 gradually increases.

As described above, through the use of hardware only without using software, the wireless communication apparatus according to this embodiment extracts the direct-current potential corresponding to the magnetic field strength from the loop antenna 1 and dims the blue LED 25 and the green LED 26 with a rectangular wave signal having the duty ratio corresponding to the direct-current potential, thereby making it possible to notify the user of the strength of the carrier wave in real time.

Next, the blink generation circuit 21 has a level conversion circuit 35, a blink oscillator circuit 36, and a monostable multivibrator 37.

The level conversion circuit 35 is a circuit for converting a waveform that appears on the terminal of the resistor 4 for adjusting a load modulation rate of the RFID function LSI 10 into an input level that the monostable multivibrator 37 which is a logic IC of the subsequent stage can accept, and has resistors 70 and 71 for setting a reference potential and a zener diode 74 for input protection. Further, the level conversion circuit 35 also has a resistor 72 for reducing the effect on the antenna and a DC cutting capacitor 73. Furthermore, in this embodiment, the level conversion circuit 35 may be realized in another configuration besides that of FIG. 1 as long as the level conversion circuit 35 can perform appropriate level conversion. In the case of using an LSI without the resistor 4 for adjusting a load modulation rate, a signal component waveform may be extracted from the loop antenna 1 directly.

The blink oscillator circuit 36 is an oscillator circuit for determining a frequency at which the LEDs of the display section blink. The output terminal of the monostable multivibrator 37 is connected through a NOT circuit 77 to one of the input terminals of a NOR circuit 84 in the blink oscillator circuit 36. Further, the output terminal of the NOR circuit 84 is connected through a resistor 83 for setting a blink frequency and a capacitor 82 to the other input terminal of the NOR circuit 84 and also connected through a resistor 78 for input protection to the input terminal of a NOT circuit 79. The output terminal of the NOT circuit 79 is connected to the input terminal of a NOT circuit 80 of the next stage. The output terminal of the NOT circuit 80 is connected through a damping resistor 81 to the other input terminal of the NOR circuit 84.

With this configuration, the blink oscillator circuit 36 oscillates at a frequency determined by the resistor 83 and the capacitor 82 to blink the LEDs. Further, in this embodiment, the blink oscillator circuit 36 is configured such that the output terminal of the monostable multivibrator 37 is connected through the NOT circuit 77 to the NOR circuit 84 and the blink oscillator circuit 36 does not oscillate when there is no output pulse from the monostable multivibrator 37 which receives the output of the level conversion circuit 35, thereby avoiding unnecessary current drain and noise radiation. Furthermore, in this embodiment, it is determined, using the level of a waveform that appears on the terminal of the resistor 4 for adjusting a load modulation rate of the RFID function LSI 10, whether or not to blink the LEDs, that is, whether the RFID card is in a communication state, thereby making it possible to detect whether the RFID card is in a communication state, keeping the detailed configuration and the communication data of the RFID function LSI 10 in the black box.

Further, the time for communication between the RFID card and the RFID card reader/writer is generally so short that the processing is completed within 1 second; therefore, a blink does not appear if the blink rate is slow. Furthermore, if the LED blink frequency exceeds 20 Hz, it becomes difficult for human eyes to recognize blinking. Therefore, this embodiment adopts a LED blink frequency that falls within the range of about 12 Hz to 20 Hz for example.

The monostable multivibrator 37 is provided to hold the state of LED blinking for a fixed time period by outputting a pulse that becomes a high level for a fixed time period upon detecting that the RFID function LSI 10 performs load switching according to an output from the level conversion circuit 35. Thus, even if the communication between the RFID card and the RFID card reader/writer ends within 0.1 ms for example, it is possible to blink the LEDs for some period of time, thereby making it possible to enhance the user's visibility.

The function combining section 23 is composed of only logic circuits which are NOR circuits 61 and 62, AND circuits 64, 65 and 66, and a NOT circuit 63. The function combining section 23 realizes the operation in which the LEDs blink changing the color by combining the operations of the magnetic field strength/brightness conversion section 22 and the blink generation circuit 21.

That is, in the function combining section 23, one of the input terminals of the NOR circuit 61 is connected to the output terminal of the OR circuit 59 in the direct-current potential/duty ratio conversion circuit 34, the other input terminal of the NOR circuit 61 is connected to the output terminal of the NOR circuit 84 in the blink oscillator circuit 36, and the output terminal of the NOR circuit 61 is connected to one of the input terminals of the AND circuit 65. Further, one of the input terminals of the NOR circuit 62 is connected to the output terminal of the OR circuit 60 in the direct-current potential/duty ratio conversion circuit 34, the other input terminal of the NOR circuit 62 is connected to the output terminal of the NOR circuit 84 in the blink oscillator circuit 36, and the output terminal of the NOR circuit 62 is connected to one of the input terminals of the AND circuit 66. The other input terminal of the AND circuit 65 is connected to the lock signal input terminal 5 of the RFID function LSI 10, and the output terminal of the AND circuit 65 is connected to the gate terminal of the FET 86 for the blue LED 25. Furthermore, the other input terminal of the AND circuit 66 is connected to the lock signal input terminal 5 of the RFID function LSI 10, and the output terminal of the AND circuit 66 is connected to the gate terminal of the FET 88 for the green LED 26.

With this configuration, the blue LED 25 and the green LED 26 illuminate with the brightness corresponding to magnetic field strength by the magnetic field strength/brightness conversion section 22 and blink in accordance with the blink signal from the blink generation circuit 21. On the other hand, when a low-level lock signal for disabling the RFID function LSI 10 is provided to the lock signal input terminal 5, the blue LED 25 and the green LED 26 go out regardless of the strength of the carrier wave and the presence or absence of the blink signal.

Further, in the function combining section 23, the input terminal of the NOT circuit 63 is connected to the lock signal input terminal 5, and the output terminal of the NOT circuit 63 is connected to one of the input terminals of the AND circuit 64. Further, the other input terminal of the AND circuit 64 is connected to the output terminal of the direct-current potential extraction circuit 30 in the magnetic field strength/brightness conversion section 22, and the output terminal of the AND circuit 64 is connected to the gate terminal of the FET 84 for the red LED 24.

With this configuration, the red LED 24 illuminates when the direct-current potential extraction circuit 30 extracts the direct-current potential from the carrier wave of the RFID card reader/writer and a low-level lock signal for disabling the RFID function LSI 10 is provided to the lock signal input terminal 5.

Figure 3:
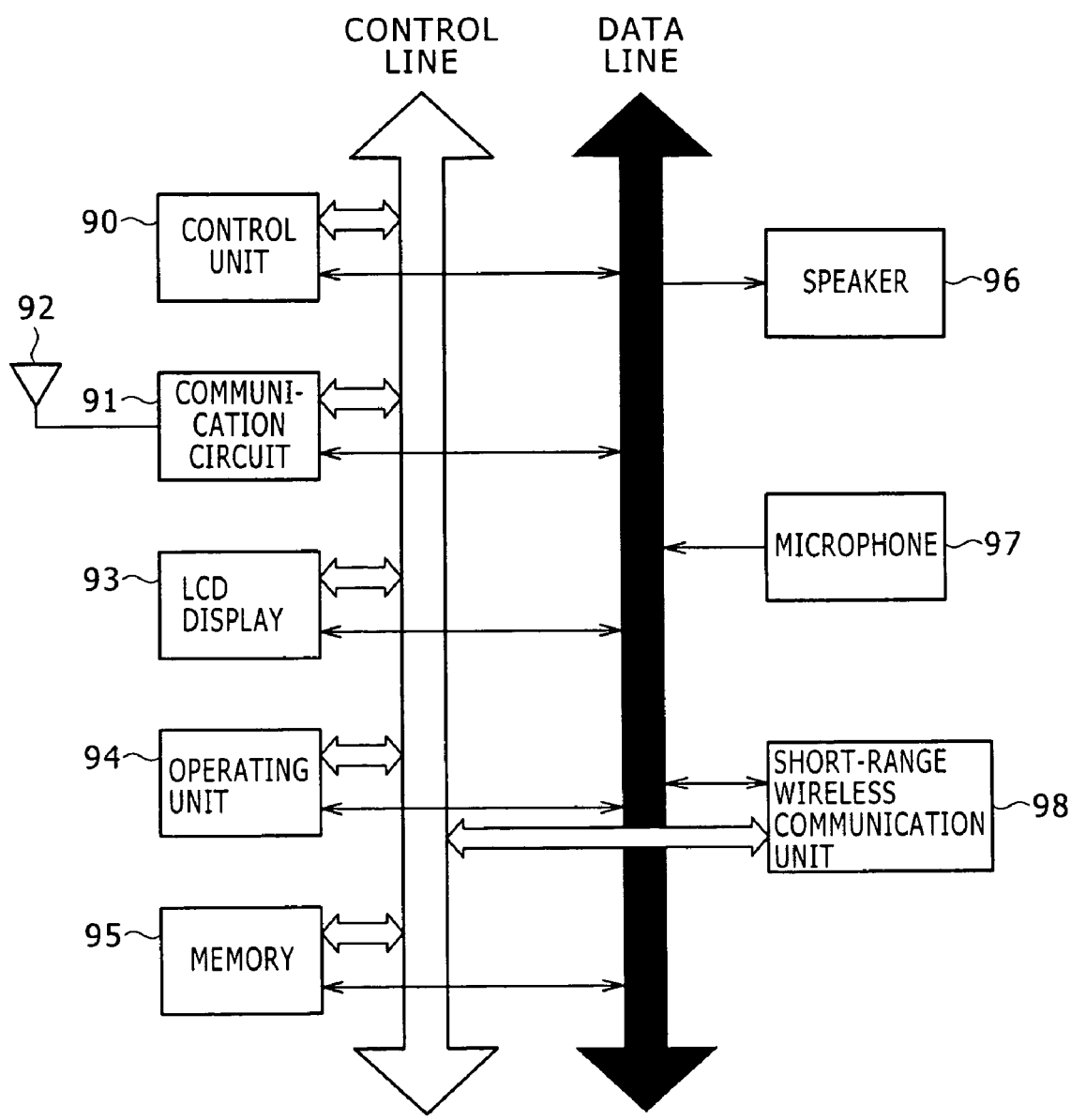
FIG. 3 is a block diagram shows the schematic internal configuration of a cellular phone terminal having a short-range wireless communication apparatus according to an embodiment of the invention.
Figure 4:
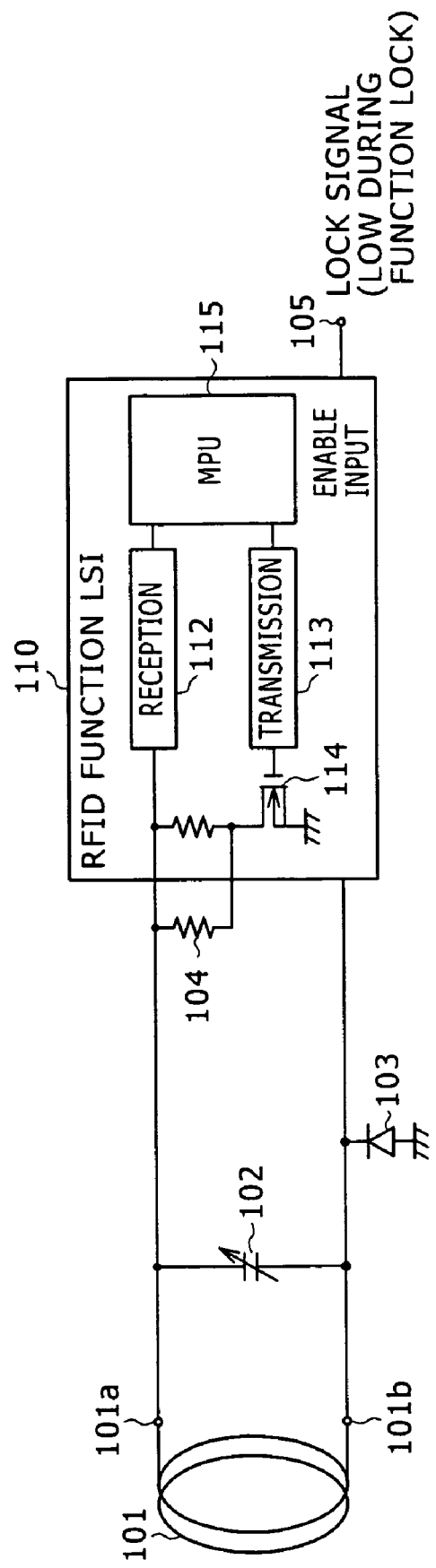
FIG. 4 is a circuit diagram of a transponder section of a past RFID card.

[Configuration of the cellular phone terminal] FIG. 3 shows the schematic internal configuration of the cellular phone terminal having the short-range wireless communication apparatus according to this embodiment.

In FIG. 3, a communication antenna 92 is, e.g., a built-in antenna, and transmits and receives a radio-wave signal for a telephone call and a packet communication. A communication circuit 91 performs frequency conversion, modulation and demodulation on a transmission/reception signal.

Received telephone call voice data is sent to a control unit 90 via a data line. The control unit 90 which includes a CPU (central processing unit) demodulates the telephone call voice data and sends the demodulated voice data to a speaker 96 via the data line.

The speaker 96 is a speaker for telephone call reception provided at the cellular phone terminal and for a ringer, music playback, television/radio music playback, and an alarm, and includes a digital/analog converter and an amplifier. The speaker 96 performs digital/analog conversion and amplification on telephone call voice data and ringer tone data, and then outputs them. Thus, it is possible to obtain a telephone call voice and a ringer tone.

A microphone 97 is a microphone for telephone call transmission and includes a digital/analog converter and an amplifier. Telephone call voice data inputted through the microphone 97 is amplified into a predetermined level by the amplifier, converted into digital voice data by the digital/analog converter, and sent via the data line to the control unit 90, where the data is encoded and sent to the communication circuit 91. At the communication circuit 91, the data is subjected to various kinds of processing such as modulation and frequency conversion, and then transmitted through the communication antenna 92.

An LCD display 93 includes an LCD panel and its driving circuit, and displays text, pictures, etc.

An operating unit 94 has keys such as a numeric keypad, a call key, a clear key, a hang-up/power key, a manner key, and a memo key, and a jog dial or a cross key etc., which are provided on the enclosure of the cellular phone terminal according to this embodiment. Further, the operating unit 94 has an operating signal generator for generating an operating signal corresponding to the operation of each key etc.

A memory 95 includes a ROM (read only memory) and a RAM (random access memory). The ROM stores an OS (operating system), a control program and various kinds of initial values with which the control unit 90 controls each unit, font data, dictionary data, various kinds of tone data for a ringer tone, a key operation tone and an alarm tone, program code for an application for creating and editing an email, program code for an application for performing various kinds of processing on an image and sound, program code for an application for performing data transmission/reception to/from the RFID function LSI 10, program code for various kinds of other applications installed on the cellular phone terminal, the ID (identification) of the cellular phone terminal, and the like. The ROM may be a rewritable ROM such as an EEPROM (electrically erasable programmable read-only memory). Further, the ROM can store email data, a telephone directory and email addresses set by the user, photo image data, downloaded photo data and music data, downloaded tone data such as a ringer tone, a key operation tone, and an alarm tone, text data, registered data of candidate words for predictive conversion, leaning data for predictive conversion, and other user setting values. The RAM stores data whenever necessary, as a work area when the control unit 90 performs various kinds of data processing.

A short-range wireless communication unit 98 has the configuration of the short-range wireless communication apparatus according to this embodiment and performs short-range wireless communication with the RFID card reader/writer (not shown).

The control unit 90 encodes or decodes the telephone call voice data, controls an originating/incoming call, and controls an alarm at the time of receiving a call. Further, the control unit 90 performs data communication with the RFID function LSI 10 according to this embodiment and its control, locks the RFID function LSI 10, controls the operation of the RFID function LSI 10, controls each component in the cellular phone terminal via a control line, and performs various kinds of computations.

In addition, although the following components are not shown in FIG. 3, the cellular phone terminal according to this embodiment includes an optical lens, an image pickup device, etc., and has a camera unit for taking a still picture and a moving picture under the control of the control unit 90 and a multimedia processing unit for playing back music and a moving image.

SUMMARY

As described above, according to the short-range wireless communication apparatus and the cellular phone terminal of this embodiment of the invention, the magnetic field strength of the carrier wave from the RFID card reader/writer is indicated by the brightness of the blue LED 25 and the green LED 26 (i.e., color), irrespective of the MPU 15 in the RFID function LSI 10 or the control unit (CPU) 90 in the cellular phone terminal. Further, it is indicated by the blinking of the blue LED 25 and the green LED 26 that the short-range wireless communication apparatus or the cellular phone terminal is in communication with the RFID card reader/writer. Furthermore, it is indicated by the lighting of the red LED 24 that the RFID card function is in the disabled state. Accordingly, the user can perceive in real time the detection state of the carrier wave, the magnetic field strength of the carrier wave, whether or not the RFID card is in the communication state, and whether communication is available. Thus, for example, even if communication is not established due to positional deviation of the RFID card, leaving the RFID function locked, or the like, the user can perceive something unusual immediately so as to take action for correcting the position or releasing the lock. Further, the user can perceive the magnetic field strength by the brightness change of the blue LED-25 and the green LED 26 (i.e., color change), thereby making it possible to easily grasp an optimum position of the RFID card relative to the RFID card reader/writer. Furthermore, once the user has grasped the optimum position, the user can hold the RFID card over the RFID card reader/writer at the optimum position from the next time onward.

Thus, according to this embodiment, it is possible to greatly reduce the possibility of a communication error by positional deviation and allow the user to take appropriate action immediately at the time of irregular communication, thereby making it possible to avoid past problems such as congestion at an automatic gate in a station and crowdedness at a checkout counter in a store. Further, a user can perceive in real time the detection state of a carrier wave, the magnetic field strength of a carrier wave, thereby almost eliminating the user's feeling of uneasiness at the time of using the RFID card.

Further, according to this embodiment, even if communication cannot be established with the RFID card reader/writer due to a failure of the cellular phone terminal having a built-in RFID card, it is possible to grasp the stage where an communication error has occurred, thereby enabling a manufacturer to easily isolate the failure to the stage level.

The above-described embodiments are examples of the invention. Therefore, the invention is not limited to the embodiments. It is obvious that those skilled in the art can make modifications and /or substitutions of the embodiments without departing from the scope and sprit of the invention.

For example, the short-range wireless communication apparatus according to the embodiment can be applied not only to the cellular phone terminal but also to a personal digital assistant (PDA), a notebook computer, a hand-held game machine, etc. As a matter of course, the short-range wireless communication apparatus according to the embodiment can be applied to the discrete RFID card as well as the incorporation into the cellular phone terminal etc.

Further, the short-range wireless communication apparatus according to the embodiment of the invention combines all the functions of blinking the blue LED 25 and the green LED 26 during communication, changing the brightness of the blue LED 25 and the green LED 26 (i.e., color) according to the strength of the carrier wave, and lighting an LED (the red LED 24) of which color is different from the ones in the normal operation during the lock of the RFID function to use these functions. However, it is possible to use the functions individually and also possible to use them by selectively combining two out of all functions.

Furthermore, the embodiment exemplifies the LEDs under the lighting control as notification devices; however, the invention is not limited to this example. For example, since the cellular phone terminal (and other mobile terminals) gives specified alarms to the user, such as vibrating the vibrator of the cellular phone terminal, outputting a specified sound, changing volume from the speaker, lighting an incoming-call LED of the cellular phone terminal, it is also possible to use any of these alarm operations or a combination thereof.

It should be understood by those skilled in the art that various modifications, combinations, sub-combinations and alterations may occur depending on design requirements and other factors insofar as they are within the scope of the appended claims or the equivalents thereof.

What is claimed is:

1. A short-range wireless communication apparatus comprising:
   a control unit configured to control cellular phone functions;
   a magnetic field strength detector detecting magnetic field strength from a carrier wave by extracting direct-current potential from the carrier wave used for short-range wireless communication;
   a lock detector detecting that a short-range wireless communication function is locked into at least a disabled state when the magnetic field strength detector detects the magnetic field strength from the carrier wave;
   a lock notification device notifying a user that the lock detector has detected the disabled state, the lock notification device including a light-emitting device which emits light with a brightness which varies based on a detected signal strength; and
   a lock notification signal generator generating a lock notification signal for operating the lock notification device in accordance with the disabled state detected by the lock detector, the lock notification signal generator converting the magnetic field strength detected by the magnetic field strength detector into a brightness adjustment signal for the light-emitting device and providing the brightness adjustment signal of the magnetic field strength notification signal to the light-emitting device.

2. The short-range wireless communication apparatus according to claim 1, wherein the lock notification device has a light-emitting device, and the short-range wireless communication apparatus lights the light-emitting device when the lock detector detects the disabled state.

3. A short-range wireless communication apparatus comprising:
   a control unit configured to control cellular phone functions;
   a magnetic field strength detector detecting magnetic field strength from a carrier wave by extracting direct-current potential from the carrier wave used for short-range wireless communication;
   a communication detector detecting signal communication from a carrier wave used for short-range wireless communication;
   a lock detector detecting that a short-range wireless communication function is locked into at least a disabled state when the magnetic field strength detector detects the magnetic field strength from the carrier wave;
   a notification device notifying a user of the magnetic field strength detected by the magnetic field strength detector, the signal communication detected by the communication detector, and the disabled state detected by the lock detector, the notification device including a light-emitting device which emits light with a brightness which varies based on a detected signal strength;
   a first notification signal generator generating a first notification signal for operating the notification device in accordance with the magnetic field strength detected by the magnetic field strength detector, the first notification signal generator converting the magnetic field strength detected by the magnetic field strength detector into a brightness adjustment signal for the light-emitting device and providing the brightness adjustment signal of the magnetic field strength notification signal to the light-emitting device;
   a second notification signal generator generating a second notification signal for operating the notification device in accordance with the signal communication detected by the communication detector; and
   a third notification signal generator generating a third notification signal for operating the notification device in accordance with the disabled state detected by the lock detector.

4. The short-range wireless communication apparatus according to claim 3, wherein the notification device has a light-emitting device, the first notification signal generator converts the magnetic field strength detected by the magnetic field strength detector into a brightness adjustment signal for the light-emitting device and provides the brightness adjustment signal of the first notification signal to the light-emitting device, the second notification signal generator generates a blink signal for blinking the light-emitting device while the communication detector detects the signal communication, and provides the blink signal of the second notification signal to the light-emitting device, and the third notification signal generator generates a light emission signal for lighting the light-emitting device in a predetermined color when the lock detector detects the disabled state, and provides the light emission signal of the third notification signal to the light-emitting device.

5. The short-range wireless communication apparatus according to claim 4, wherein the first notification signal generator converts the magnetic field strength detected by the magnetic field strength detector into a duty signal indicative of a lighting/extinguishing ratio of the light-emitting device and provides the duty signal of the brightness adjustment signal to the light-emitting device.

6. The short-range wireless communication apparatus according to claim 4, wherein the second notification signal generator holds a detection state of the signal communication by the communication detector for a fixed time and generates the blink signal for the fixed time.

7. The short-range wireless communication apparatus according to claim 4, wherein the light-emitting device of the notification device has light-emitting elements that illuminate in at least two light-emitting colors other than the predetermined color, the first notification signal generator converts the magnetic field strength detected by the magnetic field strength detector into at least two different brightness adjustment signals, provides one of the brightness adjustment signals to a light-emitting element having one of the light-emitting colors, and provides the other brightness adjustment signal to a light-emitting element having the other light-emitting color.

8. A cellular phone terminal comprising:
   a control unit configured to control cellular phone functions;
   a short-range wireless communication unit, wherein the short-range wireless communication unit having,
      a magnetic field strength detector detecting magnetic field strength from a carrier wave by extracting direct-current potential from the carrier wave used for short-range wireless communication,
      a lock detector detecting that a short-range wireless communication function is locked into at least a disabled state when the magnetic field strength detector detects the magnetic field strength from the carrier wave, a lock notification device notifying a user that the lock detector has detected the disabled state, the lock notification device including a light-emitting device which emits light with a brightness which varies based on a detected signal strength, and a lock notification signal generator generating a lock notification signal for operating the lock notification device in accordance with the disabled state detected by the lock detector, the lock notification signal generator converting the magnetic field strength detected by the magnetic field strength detector into a brightness adjustment signal for the light-emitting device and providing the brightness adjustment signal of the magnetic field strength notification signal to the light-emitting device.

9. A cellular phone terminal comprising:

a control unit configured to control cellular phone functions;

a short-range wireless communication unit, wherein the short-range wireless communication unit having, a magnetic field strength detector detecting magnetic field strength from a carrier wave by extracting direct-current potential from the carrier wave used for short-range wireless communication, a communication detector detecting signal communication from a carrier wave used for short-range wireless communication, a lock detector detecting that a short-range wireless communication function is locked into at least a disabled state when the magnetic field strength detector detects the magnetic field strength from the carrier wave, a notification device notifying a user of the magnetic field strength detected by the magnetic field strength detector, the signal communication detected by the communication detector, and the disabled state detected by the lock detector, the notification device including a light-emitting device which emits light with a brightness which varies based on a detected signal strength, a first notification signal generator generating a first notification signal for operating the notification device in accordance with the magnetic field strength detected by the magnetic field strength detector, the first notification signal generator converting the magnetic field strength detected by the magnetic field strength detector into a brightness adjustment signal for the light-emitting device and providing the brightness adjustment signal of the magnetic field strength notification signal to the light-emitting device, a second notification signal generator generating a second notification signal for operating the notification device in accordance with the signal communication detected by the communication detector, and a third notification signal generator generating a third notification signal for operating the notification device in accordance with the disabled state detected by the lock detector.

* * * * *